March 26, 1963 F. WELTY ETAL 3,082,789
FLOW CONTROL DEVICES FOR MIXING AND/OR DISPENSING APPARATUS
Filed Oct. 6, 1958 3 Sheets-Sheet 1
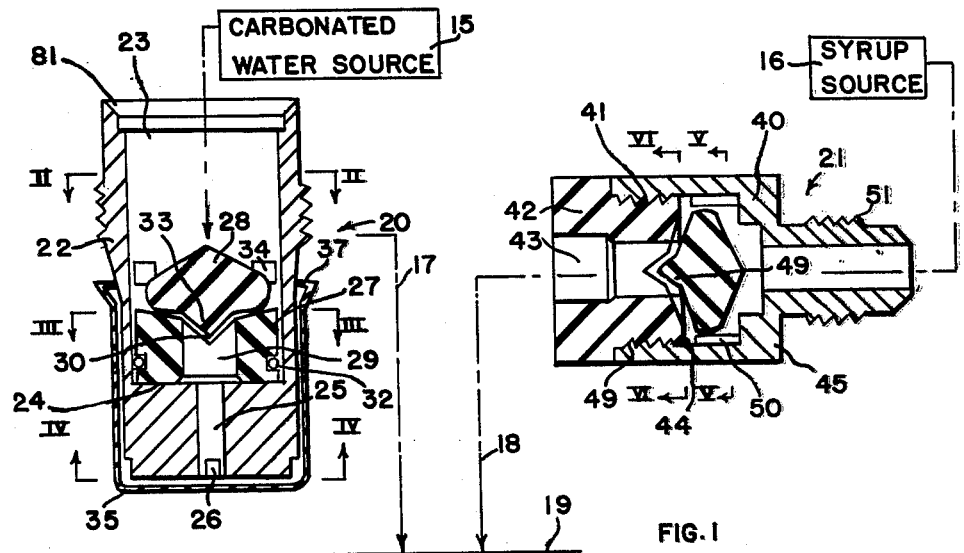
INVENTORS
FRANK WELTY
RAYMOND WELTY
BY
ATTORNEY

INVENTORS
FRANK WELTY
RAYMOND WELTY

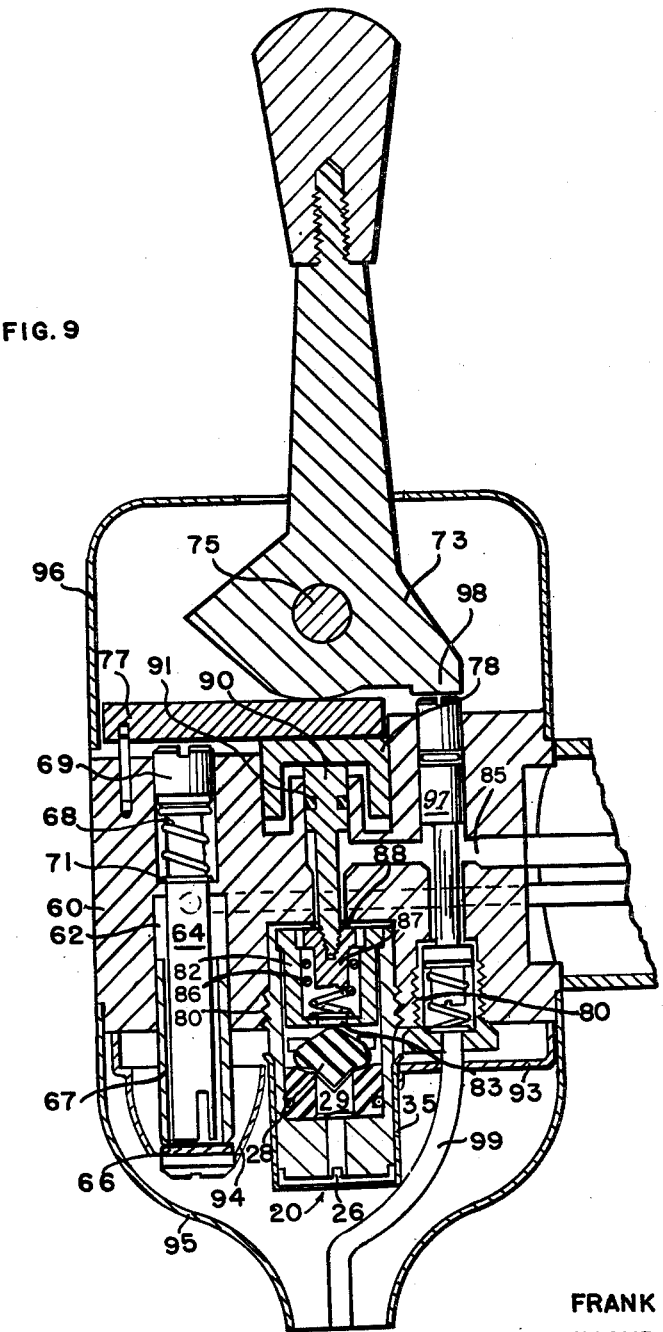

United States Patent Office
3,082,789
Patented Mar. 26, 1963

3,082,789
FLOW CONTROL DEVICES FOR MIXING AND/OR DISPENSING APPARATUS
Frank Welty, 4962 Lakewood Blvd., and Raymond Welty, 4307 Lake Road, both of Youngstown, Ohio
Filed Oct. 6, 1958, Ser. No. 765,657
7 Claims. (Cl. 137—607)

The present invention relates to flow control devices and mixing and/or dispensing apparatus generally and more particularly to the provision of improved flow control devices especially adapted for use in beverage mixing and/or dispensing apparatus. As will be understood by those skilled in the beverage mixing and dispensing arts, it is common practice to provide a source of a beverage or beverages, either carbonated or non-carbonated, and to dispense the same as individual drinks through suitable dispensing apparatus, such as a dispensing faucet, for example. In other types of dispensing installations the ingredients, which may be thick viscous syrups, carbonated water and/or plain water, for example, are stored separatedly and mixed in proper proportions at the same time they are dispensed by suitable mixing and dispensing apparatus, such as a mixing and dispensing faucet, for example. In all such installations one of the major problems encountered is that of dispensing the required quantity of the resultant drink regardless of fluctuations in the pressure or pressures of the various pressurized sources of the beverage or ingredients therefor and it is therefore the primary or ultimate object of the present invention to provide flow control apparatus for use with beverage mixing and/or dispensing apparatus which allows a drink to be properly dispensed irrespective of pressure fluctuations of the pressurized sources of the beverage.

In the illustrated embodiment of the invention there is shown a beverage dispensing installation of the mixing and dispensing type—the ingredients are properly compounded as they are dispensed—and the resultant drink is of the carbonated variety. However, it should be understood at the outset that the present invention is not limited to such an installation since the teachings thereof are equally applicable in dispensing non-carbonated and/or pre-mixed beverages will be readily apparent upon further consideration of the following specification.

A typical beverage dispensing installation of the mixing and dispensing type comprises, among other appurtenant equipment, a carbonator assembly where water is taken from a suitable supply, usually the city water lines, and carbonated under high pressure to provide a source of carbonated water. The carbonated water is then conveyed to a mixing and dispensing faucet where it is mixed with a flavoring syrup, said syrup being supplied to the faucet from a source thereof under pressure, and dispensed into a container, such as a drinking glass, for example, to provide the resultant carbonated drink. One of the most serious problems encountered in such an installation is that of obtaining a properly compounded carbonated drink each time the operator actuates the mixing and dispensing faucet. The correct proportions of carbonated water and syrup must be mixed and dispensed and the proportions of the ingredients must remain constant for each drink dispensed. Too large a proportion of the carbonated water will result in a "weak" drink while too large a proportion of the syrup provides a drink which is too "sweet." Heretofore it has been practically impossible to maintain the exact and proper proportions of the ingredients over a period of time due to fluctuation in the pressures of the pressurized carbonated water and/or syrup sources and the need exists for a practical and inexpensive means for insuring that a properly compounded drink is dispensed each time the faucet is actuated regardless of pressure variations of the sources of carbonated water and flavoring syrup.

In approaching the problem of flow control for mixing and/or dispensing apparatus, several other considerations are worthy of note. In an installation where carbonated water or a carbonated beverage is used the properties of the carbonated fluid must be considered. If the carbonated fluid is released to the atmosphere too suddenly the carbonation is lost thereby resulting in a "flat" drink. The syrup, on the other hand, is very viscous and sticky, giving rise to health and sanitary problems, and usually contains a certain amount of suspended particles or sediment, such as fruit pulp, for example. Another consideration is the intended use in the mixing and dispensing installation. Any flow control device must be relatively small, especially when used with a mixing and dispensing faucet, and inexpensive but yet capable of sustained and continuous operation.

It is therefore an object of the invention to provide improved flow control devices for mixing and/or dispensing apparatus whereby a properly compounded beverage is mixed and/or dispensed regardless of variations in carbonated water and/or syrup pressure.

A further object of the invention is to provide an improved flow control device of the "flow washer" type. This type of washer has been proposed in the prior art, as for example in United States Patent No. 2,460,647, wherein a resilient member having an opening therethrough is interposed in a fluid line and deforms to restrict the opening in response to an increase in pressure on the upstream side thereof. However, the output on the downstream side of the flow washer remains relatively constant (amount of fluid per unit time is constant) over its rated pressure range. As will be hereinafter more fully apparent, the flow washers disclosed herein embody improvements which allow the accomplishment of the objects of the invention.

A further object of the invention is to provide a flow control device of the flow washer type which is suited for handling viscous material, such as flavoring syrups, without becoming jammed or clogged by the sediment and particles contained therein.

Another object of the present invention is to provide an improved flow control assembly mounting a flow washer for use in a carbonated fluid supply line whereby the carbonation of the liquid is not lost in passing through the flow control device.

Another object of the invention is to provide flow control assemblies encasing flow washers which are characterized by their extreme simplicity in manufacture and structure. In one embodiment the casing section itself forms a portion of the flow washer thereby providing an assembly of a minimum number of parts.

A further object of the invention is the provision of an improved mixing and dispensing faucet which includes integral flow control means of the type and having the characteristics set forth above.

These, as well as other objects and advantages of the invention, will become more readily apparent upon further consideration of the following specifications and accompanying drawing wherein there is described and shown several illustrative embodiments of the invention.

In the drawing:

FIGURE 1 illustrates flow control assemblies constructed in accordance with the teachings of the present invention positioned in the supply lines of a schematically represented mixing and dispensing installation;

FIGURES 2, 3, and 4 are plan sectional views taken along the section lines II—II, III—III and IV—IV, respectively, of the flow control assembly positioned in the carbonated water supply line of FIGURE 1;

FIGURES 5 and 6 are sectional views taken along the section lines V—V and VI—VI, respectively, of the flow control assembly positioned in the syrup supply line of FIGURE 1;

FIGURE 7 is a side sectional view of an alternate flow control assembly which may be used in the carbonated water supply line of a mixing and/or dispensing installation;

FIGURE 9 is a sectional view taken along the section line IX—IX of FIGURE 8.

Figure 8:
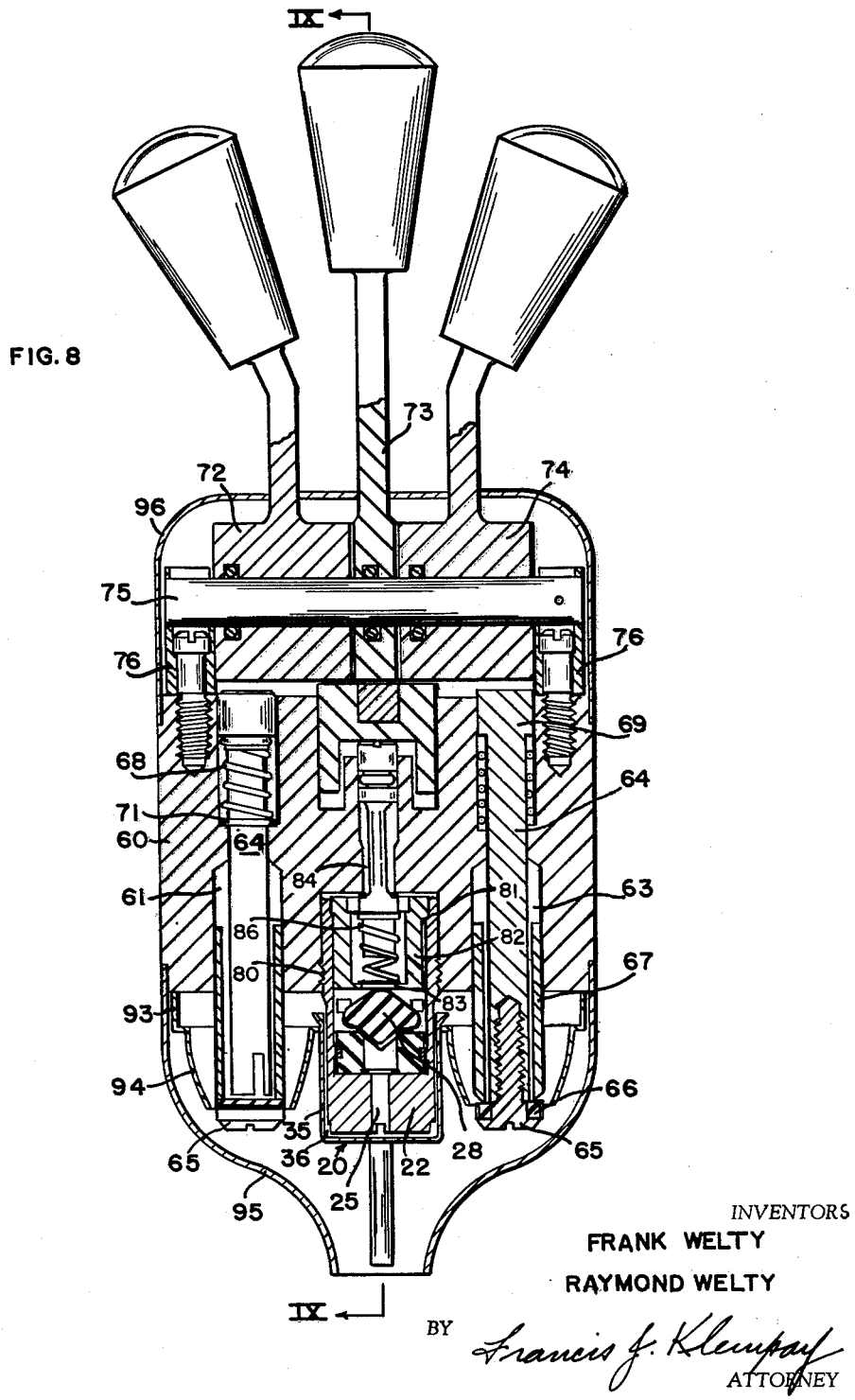
FIGURE 8 is a side sectional view of a mixing and dispensing faucet embodying integral fluid flow control means constructed in accordance with the teachings of the present invention.

Referring now to the drawing, there is shown in somewhat schematic relation a mixing and dispensing installation comprising pressurized sources of carbonated water 15 and flavoring syrup 16. The sources of pressurized carbonated water and flavoring syrup are connected individually by separate fluid supply lines 17 and 18 to mixing and dispensing apparatus 19 where the carbonated water and flavoring syrup are properly mixed and dispensed as a carbonated drink. As has been previously explained, it is of the utmost importance in such apparatus that exact proportions of the ingredients (carbonated water and flavoring syrup) are mixed each time the apparatus is actuated regardless of demand rates, pressure fluctuations, etc. and for this purpose there are positioned in the carbonated water and syrup supply lines carbonated water and syrup flow control assemblies 20 and 21, respectively. Although these assemblies are shown in FIGURE 1 as positioned outside of the mixing and dispensing apparatus, it should be understood that the same may be incorporated as an integral part of such apparatus as will be hereinafter more fully described. However, these flow control assemblies would still be positioned in the carbonated water and fluid supply circuits on the upstream side of the place where mixing is taking place.

Considering first the flow control assembly 20 situated in the carbonated water supply line, this assembly comprises a main flow control housing 22 having a generally circular outer periphery and is tapped throughout a portion of its length at 23 to define an internal shoulder 24 intermediate the ends thereof. A relatively small central aperture 25 extends axially from the shoulder 24 to the other end of the flow control housing and, as shown in FIGURE 4, communicates with a small transversely extending slot 26 in the bottom face of the flow control housing positioned along a diameter thereof.

The shoulder 24 serves as a supporting surface for a flow washer assembly comprising an annular orifice plate 27 and a diaphragm 28 which are both made of resilient material, such as rubber or nylon, for example, and have different but preselected and desired durometer (hardness) properties. The orifice plate 27 is of appreciable axial dimension and has a relatively large axial aperture 29 therein which is aligned with the central aperture 25 in the flow control housing 22. These two last mentioned apertures form a passageway for the flow of carbonated water as will be hereinafter more readily apparent. The upper surface of the orifice plate 27 has a groove 30 extending transversely along one diameter thereof and it will be noted from the drawing that the width of this groove is approximately equal to the diameter of the axial aperture 29 in the orifice plate and is V-shaped in cross section, having upwardly and outwardly diverging sidewalls. The orifice plate 27 is formed with a circular and continuous groove on the outer periphery near its bottom and which receives a resilient O-ring 32 that provides a fluid-tight seal between the orifice plate and the flow control housing. This seal prevents pressure from building up behind the orifice plate and limits fluid flow to the desired passageways as will be further explained.

The diaphragm 28 is button-like or knob-like in shape and rests on the top surface of the orifice plate 27 with an integral and downwardly protruding conical tip portion 33 extending into the axial aperture 29 of the orifice plate as shown. The tip portion 33 is approximately of the same cross sectional shape as the transversely extending groove 30 but, as mentioned above, is conical and therefore does not extend with the groove 30. The diaphragm is of slightly smaller diameter than the orifice plate and is formed with a plurality of angularly related integral radially extending spacers 34 on the top edge thereof which serve to position the diaphragm within the flow control housing and allow the free flow of carbonated water therearound.

In that portion of the flow control assembly 20 so far described, carbonated water will flow from the source to the bore 23, around the diaphragm 28, under the edges of the diaphragm 28, into the groove 30, through the axial aperture 29 and then through central aperture 25 to the slot 26. The carbonated water will exert a certain force on the diaphragm 28, said force being equal to the effective exposed area of the top portion of the diaphragm times the pressure exerted by the carbonated water, and, depending upon the durometer value of the resilient material forming this diaphragm, and the amount of force exerted, the diaphragm will be deformed to further restrict the groove 30. This in turn allows less volume of carbonated water to flow through the flow washer assembly but since the pressure is increased the output, with respect to time, will remain substantially constant. The output will also remain constant if the pressure of the source is reduced as the diaphragm will retract thereby opening the groove 30 to a greater extent as is readily apparent. Thus, the apparatus above described is operative to maintain a substantially constant output over a preselected pressure range regardless of pressure variations in the supply of carbonated water.

However, this apparatus, of and by itself, is not ideally suited for use in carbonated water supply lines because such liquid will lose its carbonation if discharged directly to the atmosphere. If the carbon water was taken directly from the flow control assembly at the slot 26 the assembly would be inoperative for the purpose intended since this slot is relatively large and the transformation from high pressures to atmospheric pressure at the output side of the flow washer assembly would be evidenced by violent agitation and churning or sputtering so that the carbonation of the liquid would be lost. It will also be noted that the output side of the flow washer assembly must be maintained either at atmospheric pressure or at very low constant pressures if the flow washer assembly is to operate in the manner contemplated.

To mitigate and effectively eliminate the problem of losing carbonation of the beverage, there is provided a cup-shaped flow control return cup 35 which is received in nesting relation over the lower end of the flow control housing 22. The internal diameter of the flow control return cup 35 is slightly larger than the outer diameter of the lower end portion of the flow control housing 22 and is held by mounting means, not specifically shown in the first sheet of the drawing, in slightly spaced concentric relation with respect to the flow control housing with its axis aligned with the center axis of the flow control housing. A small space is provided between the bottom of the flow control housing and the bottom surface of the flow control return cup. This arrangement forms a passageway 36 between the inner and outer surfaces of the cup and housing, respectively, of very small dimension and in effect provides an elongated restriction passageway for the carbonated water flowing through the control assembly. Thus, the carbonated water issuing from the slot 26 is caused to flow in a very thin sheet upwardly through the restriction passageway 36 between the flow return cup 35 and the flow control housing 22.

It is this restriction passageway that allows the carbonated water to undergo the change from a high pressure environment to atmospheric pressure without appreciable loss in carbonation while still maintaining the output side of the flow washer assembly at or near atmospheric pressure. The upper edge of the flow control return cup 35 is flanged upwardly and outwardly at 37 while the flow control housing 22 is tapered inwardly at a point adjacent thereto to provide an upwardly tapering opening at the top of passageway 36 to further insure that the transition of the carbonated beverage from high pressure to atmospheric pressure is accomplished in the desired manner without agitation.

An important advantage of the flow control assembly disclosed is that of compactness provided by the nesting relation of the flow control return cup and the flow control housing whereby the assembly may be housed and/or mounted in a minimum of space. Although the flow control assembly is compact and of small size, there is provided a restriction passageway of considerable length for the carbonated water.

Considering now the flow control assembly 21 employed in the syrup supply line of the mixing and dispensing apparatus, the problem encountered is that of providing an assembly which will not become clogged or jammed by the thick, sticky and viscous syrup or the sediment contained therein. Prior art flow control devices of the type contemplated have been found to clog or jam within a short time thus completely blocking the flow of syrup regardless of the pressures involved and necessitating frequent cleaning.

The flow control assembly 21 comprises a housing portion 49 of generally cylindrical shape which is internally treaded on near the lower end thereof at 41. Threadly received on the lower end of the housing portion is a T-shaped member 42 which is preferably made of nylon or some other like relatively hard resilient material. The T-shaped member 42 serves not only as a portion of the housing for the flow control assembly 21 but also as an orifice plate. This member has an axial aperture 43 therein to provide an outlet from the flow control assembly while the top edge portion forms a shoulder 44 upon which a diaphragm 45 rests. The shoulder 44 has a groove 46 therein and particular attention should be directed to FIGURES 1 and 6 of the drawing since the configuration of this groove allows the construction of a fluid control cartridge assembly which will not clog or jam. The groove 46 has its center along one radius of the shoulder 44 and does not extend completely thereacross as the groove 30 associated with the orifice plate in the carbonated water flow control assembly 20. Also, the groove 46 is of substantial width, being wider than half the width of the shoulder 44, and extends laterally outward on both sides of the axial aperture 43 as is clearly shown in FIGURE 6 of the drawing. In cross section this groove is deeper than the groove 30 in the carbonated water flow control assembly and although generally V-shaped, each of the side walls of the groove 46 is formed from two contiguous wall portions. A first wall portion 47 is steeply angled, sixty degrees, for example, and extends upwardly to a point within the confines of the diameter dimension of the axial aperture 43 while a second wall portion 48 is more moderately inclined, thirty degrees, for example, and extends upwardly until it meets the surface of shoulder 44. Although the meeting edges of the side walls are shown to be sharp, it is within the purview of the present invention to round these edges.

The diaphragm 45 is similar to the diaphragm employed in the carbonated water control assembly, embodying a conical tip portion 49 extending into the aperture 43, with the exception that it does not mount any spacers. In the present flow control assembly the housing 40 has integral inwardly projecting and radially disposed spacers 50 which properly position the diaphragm 45 with respect to the shoulder 44. The far end of the outlet aperture 43 is threaded while the housing 40 mounts an integral projecting threaded nipple 51 at its other end so that the flow control assembly 21 may be easily and conveniently connected in the syrup supply line 18.

In operation, the diaphragm 45 is deformed in response to the force applied thereto, said force being proportional to the pressure of the syrup, to restrict groove 46 so that the output of the syrup from the flow control assembly is substantially constant over a preselected pressure range regardless of fluctuations in the pressure of the syrup supply. When the pressure of the syrup is relatively low, the diaphragm is only partially deformed and comes in sealing contact with the moderately inclined upper wall portions 48 to restrict the groove 46 but the opening provided by the groove is still of sufficient size, by virtue of the deep and sharply inclined wall portions 47, to pass the syrup without becoming jammed or clogged by fruit pulp or other sediment. Under high pressures the diaphragm may be deformed into sealing contact with the upper edges of the wall portions 47 but the resultant passageway will still be of sufficient size to prevent jamming or clogging. The groove 46 extends only to the middle of the shoulder 44, not all the way across as in the case of the groove 30 in the orifice plate 27 associated with the carbonated water flow control assembly, in order that the same may be made larger and deeper as set forth above to prevent clogging and jamming.

A flow control assembly for a carbonated beverage may be provided utilizing the construction described above in connection with the syrup flow control assembly 21 and such an assembly is shown in FIGURE 7 of the drawing. A carbonated water flow control assembly, indicated generally by the reference numeral 55, is constructed in much the same manner as the previously described syrup flow control assembly 21 and to avoid repetition in the description, parts heretofore mentioned are indicated in this figure by primed reference numerals. The groove 46' extends to the middle of the shoulder 44' and comprises the upwardly sloping and angularly related wall portions 47' and 48'. This flow washer assembly arrangement has been found suitable for controlling carbonated water although it may be desirable to provide a more resilient diaphragm 45' because of the more fluid nature of the carbonated water. In addition to this structure, a flow return control cup 56 is positioned in nesting relation with respect to the flow control assembly to provide a restricted passageway 57 thereby preventing decarbonation of the carbonated beverage. This carbonated water flow control assembly may be preferred in certain installations over the one shown in FIGURES 1-4 because of the minimum number of parts employed and the interchangeability thereof with those of the syrup flow control assembly. Of course, the housing 40' may be tapered and shaped similar to that of the flow control housing 23 if desired.

It will be noted that the syrup and carbonated water flow control assemblies above described offer several important advantages. The structures involve a minimum number of parts since the T-shaped member 42 serves not only as an orifice plate but also as a portion of the assembly housing. The spacers 50 are mounted on the walls of the housing portion to insure that the diaphragm is always properly positioned with respect to the groove and outlet aperture thereby simplifying the diaphragm and allowing the same to be easily and cheaply produced. The cartridge assembly is characterized by its compactness and ruggedness and is therefore adapted to withstand continuous and sustained usage but yet it is easily insertable in a fluid supply line.

The mixing and dispensing apparatus 19 indicated schematically in FIGURE 1 may be a mixing and dispensing faucet and in some installations it is desirable that the carbonated water flow control assembly be mounted within the faucet proper as an integral component part thereof. Such an arrangement is shown in FIGURES 8 and 9 of the drawing wherein a mixing and dispensing faucet of the general type shown and described in our United States Patents Nos. 2,702,051 and 2,766,772, which are assigned to the assignee of the present invention, includes a flow control assembly for carbonated water.

The mixing and dispensing faucet comprises a generally cylindrical block or body portion 60 having three vertical bores 61, 62 and 63 which are positioned radially outward of the main axis of the body portion. Slidably retained in each of these bores 61-63 are plungers 64 which are bored and tapped at their lower end to receive a cap screw 65. A resilient washer 66 is carried in a recess provided therefor in each of the cap screws 65. The washers extend outwardly of the plungers 64 and are adapted to act upwardly to provide a liquid seal is will become apparent.

In accordance with the principles set forth in the above mentioned patents, the syrup dispensing valves, formed by bores 61-63 and plungers 64, must discharge the syrup at a point considerably below the lower end of body portion 60. To accomplish this there are provided tubular extensions 67 which are rigidly retained in the lower enlarged portions of bores 61-63 and depend therefrom in spaced concentric relation with respect to the plungers 64. The lower ends of the tubular extensions 67 are adapted to seat the resilient washers 66 to form therewith a fluid-tight seal. In order to provide a normally closed valve compressible coil springs 68 are positioned over the plungers 64 and act upon the enlarged heads 69 to yieldably urge said plungers upwardly. Also acted upon by the springs 68 are resilient O-rings 71 whose function is to prevent the upward passage of fluid into the enlarged portions of the bores 61-63. Syrup is supplied to the lower enlarged portions of the bores by means of suitable horizontal bores, not specifically shown, in the body portion 60. These bores are each connected to a source of flavoring syrup, not shown, by suitable conduits and in accordance with the teachings of this invention syrup flow control assemblies 21 are positioned in these conduits.

To open the normally closed syrup valves it is of course necessary to force the plungers 64 downwardly against the springs 68 and to this end there are provided three operating levers 72-74 each of which is adapted to operate one of the plungers 64. As shown, the levers 72-74 are pivotally mounted on a rod 75 which is secured at each end by lugs 76 attached to and extending upwardly from the body portion 60. The cam surfaces of operating levers 72 and 74 overlie the plungers retained in the bores 61 and 63 and drawing the ends of these levers forwardly will force the plungers in bores 61 and 63 downwardly from their seats. It is, of course, understood that the levers 72-74 are operated independently of each other.

As shown in the drawing the axis of bore 62 is offset from the axis of rod 75 and because of this positioning the operating lever 73 cannot act directly on the plunger 64 contained in the bore 62. To overcome this there is provided a short bar 77 which is operative to move vertically while maintaining a horizontal disposition. The inner end of the bar 77 is retained in a recess provided therefor in an inverted cup member 78 which is slidably received in the body member 10. The forward end of the operating lever 73 will cause bar 77 and thus cup 78 to move vertically downward.

As disclosed in our above mentioned prior United States patents, there is provided a single carbonated water valve which may be operated by each of the levers 61-63 so that carbonated water will be commercially dispensed along with flavoring syrup. The carbonated water valve includes as an integral part thereof the carbonated water flow control assembly 20 previously described in connection with FIGURE 1 of the drawing. The flow control housing 22 is threadably received at 80 in the body portion 10 in centrally disposed relation thereto. The flow control housing 22 has a shoulder 81 formed on the internal surface near the top edge thereof which serves as a mounting surface for an annular flange of a cup-shaped flow control sleeve 82 in the manner shown. The flow control sleeve has an aperture 83 in the bottom thereof to provide a passage to the diaphragm 28 and orifice plate 27.

Communicating between the bore provided in the flow control sleeve 82 and the inverted cup member 78 is a relatively small diametered bore 84 which is in communication with a source of carbonated water by means of transversely extending bore 85 and other suitable conduit means, not shown. As will be observed, a compressible coil spring 86 is received within the interior of flow control sleeve 82 with one end bearing on the bottom surface of this sleeve and tending at all times to maintain the sleeve in assembled relation with respect to the flow control housing 22. The other end of spring 86 urges a valve piston 87 mounting an O-ring 88 on its upper end, into sealing contact with a horizontal shoulder provided at the bottom end of axial bore 84. As means for actuating the valve piston 87 there is provided an actuating rod 90 which is threadably connected to valve piston 87 and extends upwardly through the bore. The upper end of actuating rod 90 is enlarged and mounts an O-ring 91 whose purpose is to prevent the upward flow of carbonated water. The upper end of the rod projects from the body member 60 and supports the cup member 78 so that upon downward movement of this member the valve piston 87 will be forced open to permit the flow of carbonated water. Each of the operating levers 72-74 at least partially overlies the cup member 78 so that upon actuation of any of these levers carbonated water as well as the particular choice of syrup will be caused to flow. By selecting the proper sizes of valve opening, a proper mixture of components will be obtained irrespective of the pressure fluctuations of the carbonated water and syrup because of the regulating action afforded by the carbonated water flow control assembly 20 and the syrup flow control assemblies 21 in the syrup supply lines.

Secured to the lower end of the body member 60 so as to form a fluid-tight seal therewith is a properly formed fluid trap 93. The trap 93 arrests the flow of carbonated water issuing from over the top edge of the flow return cup 35. The flow return cup 35 is mounted in an aperture provided in the fluid trap 93 by the flanged upper edge portion 37 and it will be apparent that this is an advantageous manner of mounting and positioning the flow control return cup—being characterized by its extreme simplicity and accuracy of mounting. The carbonated water emerges from the return cup at a relatively high velocity in a smooth and unagitated manner and at substantially atmospheric pressure and the provision of the enlarged liquid trap 93 at the exit of the restriction passageway 36 allows smooth reduction in the velocity of the stream without loss of carbonation.

Depending from the liquid trap 93 are drip cups 94 which provide the only outlet for carbonated water in the fluid trap. The arrangement is such that the syrup and carbonated liquids are uniformly mixed as the same are discharged through the proper cup 94 to a drinking glass, for example. To complete the faucet assembly and improve the appearance thereof, we provide a discharge funnel 95 and a top cover cap 96 having suitable openings therein for the extending ends of the levers 72-74.

The mixing and dispensing faucet shown in the drawing also includes a valve for discharging carbonated water at high velocity, for mixing sodas, etc. This valve, designated generally by reference numeral 97, is similar to the carbonated water valve and is operated by a projection 98 upon rearward movement of the operating lever 73. A tube 99 connects the output of this valve with the opening in the discharge funnel 95 to provide a high pressure source of carbonated water. The valve 97 is not shown to embody flow control means but it should be understood that to provide the same with this apparatus is within the purview of the invention.

From the foregoing disclosure it will be seen that we have accomplished the objects initially set forth. However, reference should be had to the following appended claims in determining the true scope of the invention since many changes may be made in the illustrated embodiments shown herein.

We claim:

1. Apparatus for dispensing a liquid from a pressurized source of said liquid comprising a tubular housing adapted to be connected at one end with said source and having a cylindrical outer surface, means within said housing providing an orifice for the passage of liquid, means within said housing to automatically control the effective size of said orifice in response to variation in pressure of said source to thus effect a substantially continuous rate of liquid flow through said housing, a cup received over the opposite end of said tubular housing and having an elongated cylindrical side wall spaced closely outward from the cylindrical outer surface of the housing to provide a liquid trap and a restricted passage for the outflow of liquid, and means providing a liquid passage from said orifice to the closed end of said cup.

2. Apparatus for dispensing a carbonated liquid from a pressurized source of said liquid comprising a tubular member adapted to be connected at one end with said source, the opposite end portion of said member having an elongated small-diametered bore therethrough, a cup received over the said opposite end portion of said member and having an elongated side wall spaced closely outward from the adjacent side wall of said member to provide a liquid trap and an elongated restricted passage of substantially uniform thickness throughout its length for the outflow of liquid, and means effecting a passage for the flow of liquid from said bore into the closed end of said cup, the effective cross-sectional areas of said means and restricted passage being greater than the cross-sectional area of said bore.

3. Apparatus according to claim 2 further including a valve body from which said tubular member is suspended in generally vertical position with said closed end of said cup lowermost, a valved passage in said valve body for connecting said source with said tubular member, and means associated with said valve body to temporarily entrap a pool of liquid as the liquid issues from the upper end of said cup, said last mentioned means having a bottom outlet whereby the liquid may be discharged by gravity into a consumer's glass.

4. Apparatus for dispensing a carbonated liquid from a pressurized source of said liquid comprising conduit means forming an elongated passage of small cross-sectional area through which the liquid flows in a solid stream and in which the pressure of the liquid is substantially dissipated, means at the outlet end of said passage to direct the liquid flow into a thin wide passage elongated in the direction of fluid flow and of greater total cross-sectional area than the cross-sectional area of the first passage but in which capillary action due to thinness of the passage keeps all the surfaces wetted and the passage free of voids during fluid flow whereby the liquid is discharged in a slow solid flow, and means to temporarily entrap a pool of liquid as the liquid issues from said wide thin passage, said last mentioned means having a bottom outlet whereby the liquid may be discharged by gravity into a consumer's glass.

5. Apparatus according to claim 4 further including automatic control means to maintain a substantially constant fluid pressure at the inlet to said first mentioned elongated passage.

6. Apparatus for mixing and dispensing a carbonated beverage comprising conduit means providing a first passage adapted to be connected to a source of carbonated water under pressure, conduit means providing a second passage adapted to be connected to a source of flavoring syrup under pressure, a flow-control device in each of said passages whereby the outflow of liquids from said passages is substantially at a continuous rate regardless of variations in pressure of said sources to thereby maintain a predetermined ratio between the volumes of water and syrup issuing from said passages, restrictive passage means elongated in the direction of fluid flow at the outlet end of the flow-control device in the passage connected to the source of carbonated water to insure that the carbonated water flows through and beyond said last mentioned flow-control device in a solid flow to thereby prevent the break-out of any carbonating gas from said carbonated water, and means to mix the water and syrup issuing from said passages prior to dispensing the same into a consumer's glass.

7. Apparatus for dispensing a carbonated liquid from a pressurized source of said liquid comprising conduit means adapted to be connected at one end with said source, the opposite end portion of said conduit means having an elongated restricted passage therethrough, means in said conduit means and positioned between the said one end thereof and the said elongated passage to provide an orifice for the flow of liquid from said one end of said conduit means to said elongated restricted passage, and a yieldable deformable member overlying said orifice on the upstream side thereof to stabilize the rate of flow of liquid through said orifice regardless of variations in pressure of said source, the arrangement being such that said elongated restricted passage insures that the liquid flows through and beyond said orifice in a solid flow to thereby prevent any break-out of the carbonating gas from the liquid.

References Cited in the file of this patent

UNITED STATES PATENTS

| | | |
|---|---|---|
| 1,492,750 | Rogers | May 6, 1924 |
| 2,454,929 | Kempton | Nov. 30, 1948 |
| 2,547,018 | Kucher | Apr. 3, 1951 |
| 2,586,348 | Kuebler | Feb. 19, 1952 |
| 2,708,092 | Smith | May 10, 1955 |
| 2,758,610 | Hively | Aug. 14, 1956 |
| 2,766,772 | Welty | Oct. 16, 1956 |
| 2,853,264 | Lodge | Sept. 23, 1958 |
| 2,951,503 | Windsor | Sept. 6, 1960 |